United States Patent [19]
Kimura et al.

[11] Patent Number: 5,854,307
[45] Date of Patent: Dec. 29, 1998

[54] INK, AND INK-JET RECORDING METHOD AND INSTRUMENT USING THE SAME

[75] Inventors: Isao Kimura, Kawasaki; Hiroyuki Maeda, Yokohama, both of Japan

[73] Assignee: Canon Kabushiki Kaisha, Tokyo, Japan

[21] Appl. No.: 345,426

[22] Filed: Nov. 21, 1994

[30] Foreign Application Priority Data

Nov. 25, 1993 [JP] Japan ................................. 5-295373
Oct. 5, 1994 [JP] Japan ................................. 6-241194

[51] Int. Cl.$^6$ ............................................. C09D 11/10
[52] U.S. Cl. ...................... 523/161; 523/205; 523/206; 524/377; 524/430; 524/513; 346/76.1
[58] Field of Search ............................ 523/161, 205, 523/206; 106/20 D; 524/430, 513, 377; 346/76.1

[56] References Cited

U.S. PATENT DOCUMENTS

| | | | |
|---|---|---|---|
| 4,246,154 | 1/1981 | Yao | 524/88 |
| 4,597,794 | 7/1986 | Ohta et al. | 106/20 C |
| 4,680,332 | 7/1987 | Hair et al. | 524/377 |
| 5,100,471 | 3/1992 | Winnik et al. | 106/23 C |
| 5,106,417 | 4/1992 | Hauser et al. | 106/20 D |

FOREIGN PATENT DOCUMENTS

| | | |
|---|---|---|
| 0355062A2 | 2/1990 | European Pat. Off. |
| 0425439A2 | 5/1991 | European Pat. Off. |
| 0465124A1 | 1/1992 | European Pat. Off. |
| 0618278A2 | 10/1994 | European Pat. Off. |
| 3240586 | 10/1901 | Japan |

OTHER PUBLICATIONS

M. Croucher et al., Ind.Eng.Chem.Res.,28, 1712–1718 (1989).

K. Prasad, et al., Journal of Celloid and Interface Science, vol. 69, No. 2, pp. 225–232 (Apr. 1979).

Y. Osada et al.,Journal of Chem.Soc.of Japan, 1976 (1), pp. 171–174 (abs English).

Y. Osada et al., Journal of Chem.Soc.of Japan, 1983 (6), pp. 812–818 (abs English).

Y. Osada et al., Journal of Chem.Soc.of Japan, 1976 (5), pp. 832–836 (abs English).

*Primary Examiner*—Marion E. McCamish
*Assistant Examiner*—John J. Guarriello
*Attorney, Agent, or Firm*—Fitzpatrick, Cella, Harper & Scinto

[57] ABSTRACT

Disclosed herein is a water-based ink composition comprising coloring material particles obtained by causing a dye to be adsorbed on or bonded to fine particles or an inorganic colloidal substance, and an aqueous solution of a water-soluble polymer dispersing the coloring material particles therein, wherein the polymer chains of the polymer in the composition undergo dissociation or association by its temperature change or pH change.

13 Claims, 9 Drawing Sheets

INK, AND INK-JET RECORDING METHOD AND INSTRUMENT USING THE SAME

BACKGROUND OF THE INVENTION

1. Field of the Invention

The present invention relates to an ink, in particular, an ink suitable for use in ink-jet recording, and an ink-jet recording method using such an ink and ink-jet instruments containing the ink therein.

2. Related Background Art

Water-based inks have heretofore been principally used as ink-jet recording inks from the viewpoint of safety, odor and the like. There have been known inks in which one or more of various water-soluble dyes or pigments are dissolved or dispersed in water or a mixed solvent of water and a water-soluble organic solvent, and a humectant, a dye-dissolving aid, a mildewproofing agent and/or the like are added thereto as needed. For the past few years, ink-jet recording has conspicuously spread because it has such many advantages as an ink can be ejected in a proportion of several thousand droplets per second to conduct high-speed recording with ease, noise is scarcely produced, multi-color recording can be performed with ease, high-resolution recording can be effected, and recording can be conducted on plain paper.

With the development of low-cost and high-performance personal computers and the standardization of GUI environment in recent years, even image recording by printers or the like has been required to achieve high coloring, high quality, good fastness properties, high-resolution recording and high-speed recording. A technical idea that a coloring material component having high water fastness is left on the surface of paper as much as possible, edges of printed dots are made sharp, and the occurrence of feathering is also lessened is being proposed.

M. Croucher et al. have indicated problems involved in the conventional homogeneous inks and moreover proposed, as an ink for ink-jet, a heterogeneous ink making use of a latex. [M. Croucher and M. Hair, Ind. Eng. Chem. Res., 28, 1712–1718 (1989)].

U.S. Pat. No. 4,246,154 discloses an ink in which fine particles of a vinyl polymer are colored with a dye and anionically stabilized. U.S. Pat. No. 4,680,332 discloses a heterogeneous ink in which a water-insoluble polymer containing an oil-soluble dye and combined with a nonionic stabilizer is dispersed in a liquid medium. In U.S. Pat. No. 5,100,471, there has also been proposed a water-based ink comprising a solvent and colored particles composed of a polymer core and a silica shell to which a dye has been bonded by covalent bonding. This ink has such features as a brighter color is developed on paper, temperature stability is good, and water fastness is excellent.

On the other hand, Japanese Patent Application Laid-Open No. 3-240586 has proposed, as a nonaqueous ink, an ink in which colored particles coated with a resin to be swelled with a dispersion medium are dispersed in kerosene or the like. In this proposal, it is said that the ink is effective in, particularly, prevention of image feathering and of clogging at an orifice for ejecting ink droplets.

The anionically stabilized ink as described in the above prior art involves a problem that a pH region in which the dispersion is stable is narrow, and the selection range of the dye is hence limited. In addition, it has a disadvantage that a printed dot thereof is small in spread on paper, and an optical density (OD) required is hence hard to achieve. With respect to the reduction of fixing time, which is required for high-speed recording, it is considered that the ink has little effect because fixing depends on only evaporation and penetration like the conventional image-forming means.

According to the disperse ink comprising a polymer containing an oil-soluble dye and combined with a nonionic stabilizer, the selection range of the dye can be widened. As with the above ink, however, this ink has little effect on the shortening of fixing time because fixing is based on a mechanism depending on evaporation and penetration. In addition, the ink is disadvantageous even from the viewpoint of color mixing (bleeding) between different colors because it takes a lot of time to fix adjacent dots.

The disperse ink of the polymer core/silica shell structure is excellent in dispersion stability of the pigment, but does not provide a sufficient OD because the ink has no particular means for the aggregation of the coloring material on the surface of paper. In addition, it is considered that the ink has little effect on the reduction of fixing time because fixing depends on evaporation and penetration. Therefore, the ink involves a problem that bleeding occurs.

As a problem common to the above prior art, may be mentioned a problem that the rub-off resistance of recorded images is poor because the adhesion of the coloring material to the surface of paper is not taken into consideration in such inks.

The nonaqueous ink in the prior art involves problems of odor, safety and the like because it uses kerosene as a dispersion medium.

Water-based inks, particularly, inks for ink-jet are required to have such physical properties as the surface tension is at least 30 mN·m$^{-1}$, the viscosity is 1 to 20 mN·s·m$^{-2}$, pH is 3 to 10 and fixing time is 20 seconds or shorter (it is better to be the shortest possible time).

Here, the transfer of ink to paper is considered. With respect to the transfer phenomenon of liquid to paper, the Lucas-Washburn equation has been generally known. Supposing an amount of the liquid transferred, a roughness index, an absorption coefficient, transferring time and wetting-starting time are V, Vr, Ka, T and Tw, respectively, in case the liquid is water, this is represented by the equation $$V = Vr + Ka(T - Tw)^{1/2}. \qquad (1)$$

In the equation (1), Ka is related to physical properties of both paper and ink and is represented by the equation $$Ka = (r\gamma \cos \theta / 2\eta)^{1/2} \qquad (2)$$

wherein r is a capillary radius, $\gamma$ is a surface tension of the liquid, $\theta$ is a contact angle, and $\eta$ is a viscosity of the liquid.

In order to leave a coloring material on the surface of the paper, from the equation (1), it is necessary to delay the penetration of the liquid, namely, make Ka small, as far as possible. (the time of evaporation can be gained by making Ka small.) It is understood that it is only necessary that the surface tension, viscosity and contact angle be made low, high and great, respectively, as physical properties of an ink required to do so. However, the physical properties of the ink for ink-jet as described previously are limited. It is thus difficult to control Ka.

When the liquid is a nonaqueous solvent, for example, ethanol on the other hand, the wetting-starting time Tw in the equation (1) may be ignored. Therefore, fixing can be accelerated. However, Ka also becomes greater, and so the penetrating effect is increased, resulting in an image on which "feathering" occurs to a great extent. In addition, the term of $\cos \theta$ in the equation (2) is determined by the combination of ink and paper. Therefore, whether the quality of images is good or poor depends on the kind of paper used. Namely, such an ink cannot satisfy paper nondependence.

It is considered that the above-mentioned problems may arise even on the conventional coloring material-dispersed inks so far as their image formation depends on penetration and evaporation.

SUMMARY OF THE INVENTION

It is accordingly an object of the present invention to provide a water-based ink which can overcome the above drawbacks involved in the prior art, can achieve high image density, is excellent in fixing ability and rub-off resistance on paper, causes little feathering and provides recorded images excellent in water fastness, and an ink-jet recording method using such an ink and ink-jet instruments containing the ink therein.

The above object can be achieved by the present invention described below.

According to the present invention, there is thus provided a water-based ink composition comprising coloring material particles obtained by causing a dye to be adsorbed on or bonded to fine particles or of an inorganic colloidal substance, and an aqueous solution of a water-soluble polymer dispersing the coloring material particles therein, wherein the polymer chains of the polymer in the composition undergo dissociation or association by its temperature change or pH change.

According to the present invention, there is also provided a water-based ink composition comprising coloring material particles obtained by causing a dye to be adsorbed on or bonded to fine particles or of an inorganic colloidal substance, and an aqueous solution containing a water-soluble polymer and a stringing polymer, in which the aqueous solution disperses the coloring material particles therein, wherein the polymer chains of the water-soluble polymer in the composition undergo dissociation or association by its temperature change or pH change.

According to the present invention, there is further provided an ink-jet recording method comprising applying droplets of an ink formed by an ink-jet system to a recording material to conduct recording, wherein any one of the water-based inks described above is used as said ink.

According to the present invention, there is still further provided an ink cartridge comprising an ink container portion with an ink held therein, wherein any one of the water-based inks described above is used as said ink.

According to the present invention, there is yet still further provided a recording unit comprising an ink container portion with an ink held therein and a head from which the ink is ejected in the form of ink droplets, wherein any one of the water-based inks described above is used as said ink.

According to the present invention, there is yet still further provided an ink-jet recording apparatus by which droplets of an ink formed by an ink-jet system are applied to a recording material to conduct recording, wherein the apparatus comprises the ink cartridge or recording unit described above.

DESCRIPTION OF THE PREFERRED EMBODIMENTS

Figure 1:
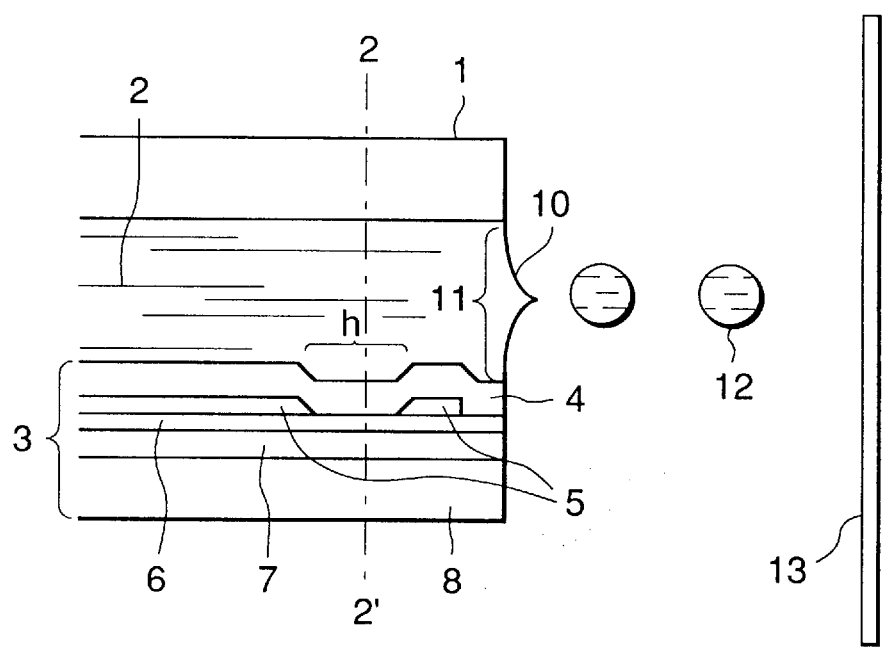
FIG. 1 is a longitudinal cross-sectional view of a head of an ink-jet recording apparatus.

The present inventors have found that the above-described limitations are based on the fact that an ink comprises a homogeneous liquid composed of a coloring material and a solvent, and thus discovered an ink in which a coloring material and a solvent separately behave on a recording material such as paper.

More specifically, the ink adopts a mechanism that homogeneous dispersion is realized during a state of ink, and such state changes on paper. According to such change of state, at least one polymer which is dispersing and dissociating during a state of ink at a low temperature undergoes association (intermolecular hydrogen bonding, hydrophobic bonding, etc.) at a temperature higher than that in the dispersed state (Mechanism 1). In addition, when the polymer combines with coloring material particles, the aggregation of the coloring material on paper is achieved. The ink also has a feature that such change of state is caused even by a slight difference in pH between on paper and in the ink. On the other hand, since a solvent can freely move through interstices of reticulate polymer chains when the polymer undergoes association, the separation of the coloring material from the solvent can be realized. Besides, such change of state is also effective for shortening of fixing time by selecting a solvent relatively high in penetration rate into paper.

The coloring material-solvent separation according to the above-described mechanism (Mechanism 1) can be realized even by a process different from the above process. Namely, it is only necessary to select such a polymer that it keeps a dissolved state owing to hydrophobic hydration at a low temperature and undergoes aggregation of its polymer chains due to dehydration at a high temperature (Mechanism 2).

Inks undergoing the change of state by such mechanisms will hereinafter be called HES (Heteromorphic Separation) inks.

Further, the present invention has permitted the provision of printed dots having sharp edges on a recording material, and caused the adhesion of the coloring material to paper, thereby solving the problem of rub-off by using a self-adhesive polymer or adding a stringing polymer in addition to the coloring material-solvent separation by the above-described mechanisms (Mechanisms 1 and 2).

Description is then given as to the coloring material particles used in the HES inks according to the present invention.

The coloring material particles have the so-called core/shell structure. Examples of materials usable in the core include water-insoluble or hardly water-soluble metal oxides, metal phosphates, metal hydrogenphosphates, metal silicates, titanates, tangstates, zirconates and white fine particles (inorganic compounds) comprising a complex thereof.

These fine particles have active sites such as adsorbed water and a hydroxyl group (OH) at their surfaces. Among others, inorganic powders exhibiting a surface acidity or having an isoelectric point of pH 7 or lower are particularly preferred. Examples thereof include $SiO_2$, $Al_2O_3$, $B_2O_3$, $ZrO_2$, $TiO_2$, $SiO_2\text{-}Al_2O_3$, $BPO_4$, $AlPO_4$, $Zr(HPO_4)2H_2O$, $Al(HPO_4)2H_2O$, $Ti(HPO_4)2H_2O$, $Ti_3(PO_4)_4$, zeolite, talc, kaolin, $BaTiO_3$, $MgTiO_3$, $CaTiO_3$, $SrTiO_3$, $CaWO_4$, $BaWO_4$, $BaZrO_3$, etc. These strongly adsorb direct dyes having anionic moieties such as sodium sulfonate and/or sodium carboxylate and can substantially insolubilize such dyes.

On the other hand, inorganic fine particles having a surface basicity, such as MgO, $\gamma\text{-}Al_2O_3$ and ZnO, are lower in adsorptivity than the above inorganic compounds and hence may exhibit low dye adsorption in some cases. In order to use such powder as a core for the coloring material, it is desirable to use a dye-fixing agent (dicyan type, polyamine type or the like) in combination.

Since the above inorganic compounds have a hydroxyl group at their surfaces, they can covalently combine with reactive groups of reactive dyes such as the chlorotriazine, vinylsulfone and chloropyrimidine types and are suitablefor use in insolubilization of the dyes. Besides, alumina sol of a boehmite structure is a cationic colloid and is low in isoelectric point. Therefore, a direct dye in the form of sodium sulfonate or the like directly reacts to the alumina sol to aggregate and be insolubilized. Similarly, colloidal silica is also low in isoelectric point and hence reacts to the direct dye. Therefore, such silica is a substance capable of insolubilizing the dye.

Examples of dyes useful in the practice of the present invention include black dyes such as C.I. Direct Black 17, 19, 62 and 154, C.I. Food Black 2, C.I. Reactive Black 5 and dyes described in U.S. Pat. No. 5,053,495; yellow dyes such as C.I. Direct Yellow 11, 44, 86 and 142 and C.I. Reactive Yellow 2; magenta dyes such as C.I. Direct Red 227, C.I. Acid Red 52 and C.I. 45100; and cyan dyes such as C.I. Direct Blue 15 and 199, C.I. 42090, C.I. Acid Blue 9 and C.I. Reactive Blue 5.

Besides these dyes, those whose water fastness has been enhanced by decreasing the soluble groups, and those of a special grade the solubility of which has been sensitized to pH, may be used.

The adsorption or bonding of a dye as mentioned above to the surfaces of fine particles or an inorganic colloidal substance can be achieved by using the following processes.

First, in case the fine particles are composed of a metal oxide, there may be mentioned a process of directly dyeing fine particles in which an aqueous dye solution is added to, for example, finely powdered silica having a particle size of about 0.1 μm, the mixture is kneaded and dried, and the resultant agglomerate is then ground again, or in which the fine powder is added to the aqueous dye solution to dye the powder; a process according to the formation of precipitate in which an aqueous dye solution is added to an aqueous solution of sodium aluminate in advance, carbon dioxide is introduced into the mixture to crystallize aluminum hydroxide, and the resulting crystals are dried to obtain the coloring material particles; a process according to the so-called surface nucleation process in which fine particles of a metal oxide are dispersed in an aqueous solution of a hydrolyzable metal salt and a dye in advance to provide a composite film of a metal hydroxide and the dye on the surfaces of the fine particles by the hydrolysis or neutralization reaction of the salt; and the like.

Further, the coloring material particles according to the present invention may also be prepared by a process of curing and coating in a solution (gel capsuling process, aqua-capsuling process, etc.) in which an aqueous solution of a polyelectrolyte containing a core material and a coloring material such as a dye is added dropwise to an aqueous solution containing a metal ion such as a Ca, Sr or Ba ion to form a insoluble wall film on the surface of the core material. In this invention, preferable examples of the polyelectrolyte include sodium alginate and sodium pectate.

Second, in case the fine particles are composed of a metal phosphate, there may be mentioned a process according to the formation of precipitate in which an aqueous dye solution is added to an aqueous solution of ammonium phosphate in advance, an aqueous solution of calcium nitrate is then added, and an acid is added further to precipitate calcium phosphate; and the like.

For the metal hydrogenphosphates, metal silicates, titanates, tangstates and zirconates, the coloring material particles can also be obtained in the same manner as described above.

An example of a process of causing a dye to be adsorbed on the inorganic colloidal substance includes a process in which an aqueous dye solution is added to an aqueous solution or powder of the inorganic colloidal substance to gel it, and the resulting gel is dried and then ground again. However, it is difficult to disperse particles unless the increase of particles due to gelation is suppressed by making colloidal particles sufficiently small in advance, or the like. Accordingly, when several tens % of ethanol or the like is mixed with an aqueous solution of alumina sol or the like in advance, and the aqueous dye solution is added thereto to aggregate it, the reaction rate becomes slow, and so it is effective in suppressing the increase of particles. Besides, there may be mentioned a process in which fine particles of a metal oxide such as $Al_2O_3$ are dispersed in the aqueous sol solution in advance, and an aqueous dye solution is added while crushing by a ball mill.

In the present invention, such coloring material particles are contained in an ink in an amount ranging generally from 0.01% to 8.0% by weight, preferably from 0.05% to 5.0% by weight based on the total weight of the ink.

Incidentally, since the fine particles as described above are only required to adsorb or bond the dye to the surfaces thereof, a similar effect can be achieved by coating the surfaces of fine particles of an organic polymer such as a water-insoluble polyacrylate, polyvinyl compound or polystyrene with the inorganic compound described above. Besides, it goes without saying that the same effect can be achieved by coating the surfaces of the fine particles of the organic polymer with the inorganic colloidal substance.

The water-soluble polymer as the second component will now be described in detail.

Polymethacrylic acid (hereinafter referred to as PMAA) is a water-soluble linear polymer having methyl groups which are hydrophobic groups and carboxyl groups which are hydrophilic groups. This polymer has been known to undergo association and shrinkage by itself or with polyethylene glycol (hereinafter referred to as PEG) and PEG-PPG (polypropylene glycol) at a high temperature by hydrogen bonding, and dispersion and dissociation at a low temperature [Yoshihito Osada and Yutaka Saito, Journal of The Chemical Society of Japan, (1), 171 (1976); and Yoshihito Osada, Yosuke Takeuchi and Masayoshi Koike, Journal of The Chemical Society of Japan, (6), 812 (1983)]. This is due to the association and dissociation between the carboxyl group in PMAA and the ether group in PEG owing to the reversible complex formation (the above-described mechanism). These may undergo association or dissociation even by a slight pH change. More specifically, the dissociation of the carboxyl group occurs at a pH of about 10, while the association and shrinkage occur at a pH of about 7. This means that since the surface of a recording material such as paper is kept at a pH ranging from 5 to 9, the pH of an ink containing the polymer useful in the practice of the present invention, which has been adjusted to about 10 in advance, lowered at a moment the ink is applied to the paper, resulting in the aggregation of a coloring material on the paper surface.

Figure 9A:
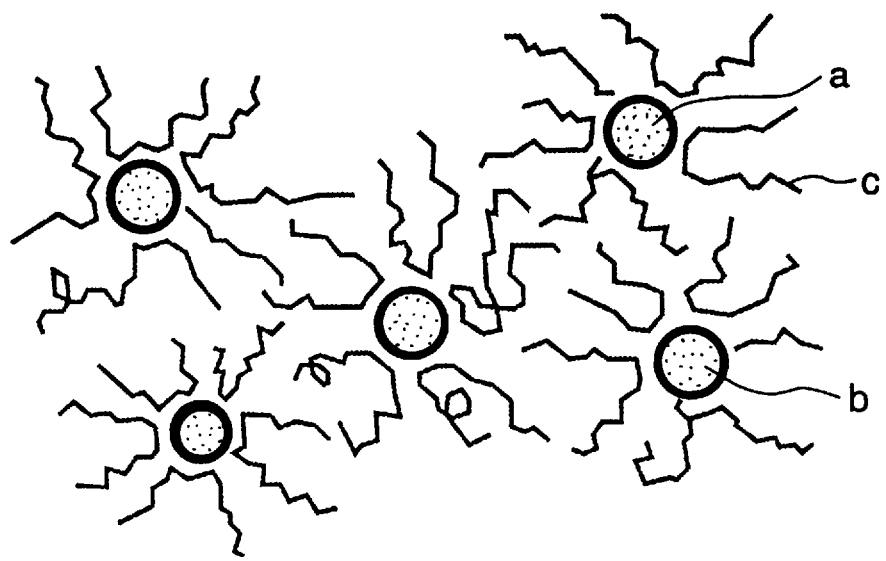
FIG. 9A is a conceptual view schematically illustrating a state of dissociation in an ink according to the present invention.
Figure 9B:
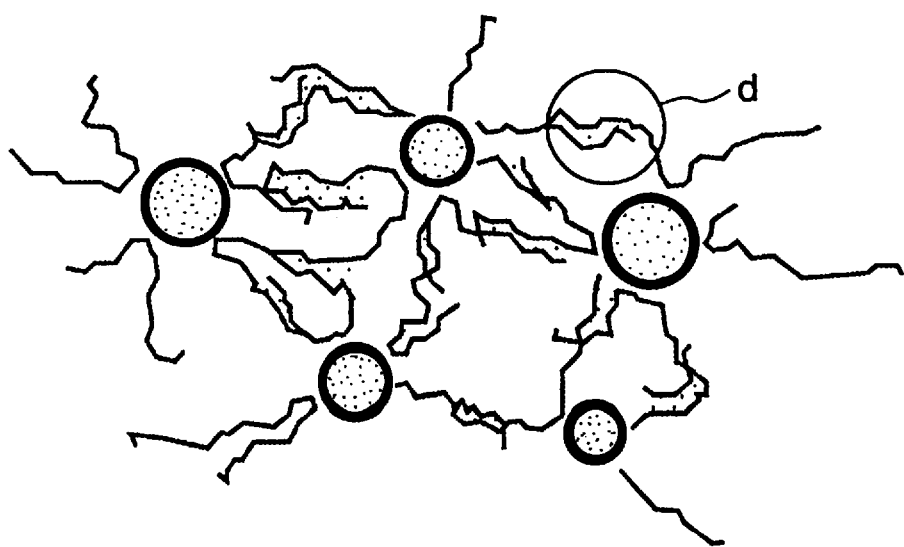
FIG. 9B is a conceptual view schematically illustrating a state of association in an ink according to the present invention.

On the other hand, PMAA (or a salt thereof) serves as a dispersing agent, in particular, for hydrophilic pigment particles. Therefore, as illustrated in FIG. 9, when such a polycarboxylic acid type polymer is used, one of the ends of its polymer chains can be adsorbed on the coloring material particles used in the practice of this invention, and the other ends thereof can undergo the association-dissociation as described above with the polymer chains bonded to other coloring material particles. Namely, in the association state, many coloring material particles become reticulately bonded to each other. In the association state, the reticulate polymer shrinks with its hydrophobic group outside. Therefore, water molecules can freely pass and move through interstices of the reticulate polymer chains.

The above-described reversible association-dissociation is observed in a range of from 20° C. to 50° C., this range coinciding with the operating temperature (30° C. to 60° C.) of an ink-jet recording head. Namely, the polymer is kept reticulate by keeping the temperature of the recording head 50° to 60° C. or controlling the temperature of ink droplets on a recording material within that range. When the coloring material particles are bonded in a reticulated state, the coloring material is trapped on the recording material such as paper by the fibers of the paper, and so it is realized that the coloring material is left on the surface of the recording material, namely, coloring ability is improved.

The above-described change of state is based on the dissociation of the coloring material particles during a state of ink and the association thereof on the paper.

In order to better stabilize the dispersion of the coloring material particles, besides PMAA there may be used a proper amount of the conventionally used dispersant, for example, a naphthalenesulfonic acid-formalin condensate, a polystyrenesulfonate, a polyacrylate, a salt of a diisobutylene-maleic acid copolymer, carboxymethylcellulose, a polyethylene oxide (PEO)-polypropylene oxide (PPO)-polyethylene oxide (PEO) block copolymer, a styrene-maleic acid copolymer, a polystyrene-polyacrylamide copolymer or a styrene-acrylic acid copolymer.

Polymers other than PEG, for example, poly(N-vinyl pyrrolidone) (PVP), polyvinyl alcohol (PVA), polyvinyl methyl ether (PMVE), etc., may also form complexes with PMAA. However, since their equilibrium greatly shifts on the complex-forming side, they cannot be expected to undergo the same reversible change as in PEG [Yoshihito Osada and Yutaka Saito, Journal of The Chemical Society of Japan, (5), 832 (1976); and Yoshihito Osada, Yohsuke Takeuchi and Masayoshi Koike, Journal of The Chemical Society of Japan, (6), 812 (1983)].

However, the present inventors have found that when these polymers are added to the PMAA-PEG system in a small amount, such an effect as the system has a partially reticulate structure from the beginning is brought about. This effect is effective in ancillarily accelerating heteromorphism.

As the polymer undergoing reversible dissolution-aggregation in the other mechanism (Mechanism 2), may be used combinations of polyacrylic acid and poly(N-alkyl substituted acrylamide) and polymers of the type that they undergo aggregation of polymer chains due to the formation of hydrogen-bonding complexes at a high temperature and swelling-dissolution owing to hydrophobic hydration at a low temperature between a carboxyl group and an amide group or between amide groups like poly(N-alkyl substituted acrylamide).

The above-mentioned PEO-PPO-PEO block copolymer may also be used in the present invention because it forms a great asymmetrical micelle in a specific temperature range (clouding point) to undergo association (the above-described Mechanism 1). This block copolymer is a surfactant sold under the trade name of PLURONIC (Wyandotte Chemicals Company). The association temperature of this block copolymer can be controlled by changing the proportion by weight of the polyoxyethylene, i.e., the hydrophilic group segment, contained in the copolymer [Prasad, K. N., Luong, T. T., Florence, A. T., Paris, J., Vaution, C., Seiller, M., and Puisieux, F., J. Colloid Interface Sci., 69, 225 (1979)].

In the present invention, the above-described water-soluble polymer is contained in the ink in an amount ranging generally from 0.01% to 10.0% by weight, preferably from 0.05% to 8.0% by weight based on the total weight of the ink.

Among the polymers used as the second components, PEG has an effect to adhere to the surfaces of paper and the like. However, when a stringing polymer as the third component is added to the ink with a view toward enhancing such adhering effect and suppressing the formation of uneven images owing to its stringiness, desirable fastness properties of images formed such as the improvement of rub-off resistance can be given. However, the stringing polymer essentially has as its object viscosity increase, and so the amount of the stringing polymer used is naturally limited. It is therefore desirable to control its amount used within the range of the limitation (viscosity of 1 to 20 $mN \cdot s \cdot m^{-2}$) on the ink-jet recording inks. The amount used is preferably within a range of from 0.001% to 5% by weight, more preferably from 0.005% to 1% by weight based on the weight of the ink.

As the stringing polymer, there may be used polyethylene oxide having a molecular weight of at least 100,000 (if the molecular weight is lower than 100,000, its stringing effect becomes less for its amount added, and its thickening effect becomes noticeable), a starch-type thickener (wheat starch, British gum, dextrin, etc.), a cellulose derivative-type thickener (methylcellulose, hydroxyethylcellulose, carboxymethylcellulose, etc.), a seaweed-type thickener (sodium alginate, agar, carrageenan, glue plant), a gum-type thickener (locust bean gum, guar gum, gum arabic, tragacanth gum, karaya gum, crystal gum, etc.), a synthetic thickener (vinyl acetate/maleic anhydride copolymers, acrylic acid copolymer/PVA block copolymers, etc.) for textile printing, respectively, and the like.

The inks of the present invention composed of the above described components may contain such humectants and dissolving aids as mentioned below with a view toward further imparting suitability for ink-jet such as reliability and storage stability. Examples of such materials include alkylene glycols such as ethylene glycol, diethylene glycol, triethylene glycol and propylene glycol; thiodiglycol; 1,2,6-hexanetriol; amino-alcohols such as monoethanolamine, diethanolamine and triethanolamine; aprotic polar solvents such as methylformamide, dimethylacetoamide, dimethyl sulfoxide and sulfolane; lower alkyl ethers of polyhydric alcohols, such as ethylene glycol monomethyl (or monoethyl) ether, diethylene glycol monomethyl (or monoethyl) ether and triethylene glycol monomethyl (or monoethyl) ether; glycerol; formamide, 2-pyrrolidone, N-methyl-2-pyrrolidone; sorbitol; and the like. These are preferably contained in the inks in a range of from 1% to 40% by weight based on the total weight of the ink.

When an alkyl alcohol such as methanol, ethanol, propanol or butanol is contained in the inks according to the present invention upon using such an ink in ink-jet recording, their ejection properties are improved. Such an ink is hence more effective. These alcohols are preferably contained in an amount ranging from 1% to 30% by weight based on the total weight of the ink.

As necessary, the inks according to the present invention may contain further additives such as surfactants, rust preventives, mildewproofing agents and antioxidants.

As described above, the inks according to the present invention are effective upon use in ink-jet recording. Ink-jet recording methods include a recording method in which thermodynamic energy is applied to an ink to eject droplets of the ink, and a recording method in which thermal energy is applied to an ink to form bubbles in the ink, thereby ejecting droplets of the ink. The inks according to the present invention are particularly suitable for use in these recording methods.

Figure 2:
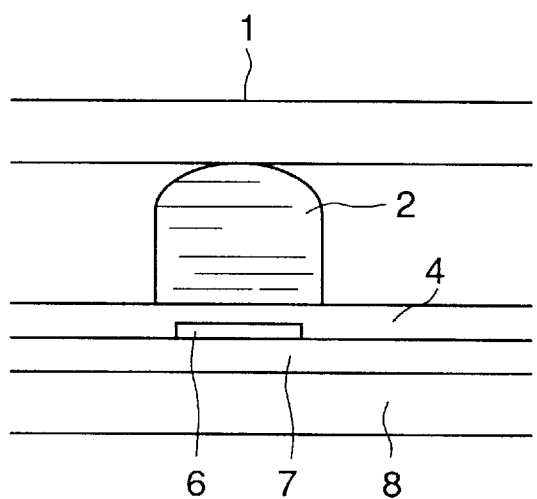
FIG. 2 is a transverse cross-sectional view of the head of the ink-jet recording apparatus.
Figure 3:
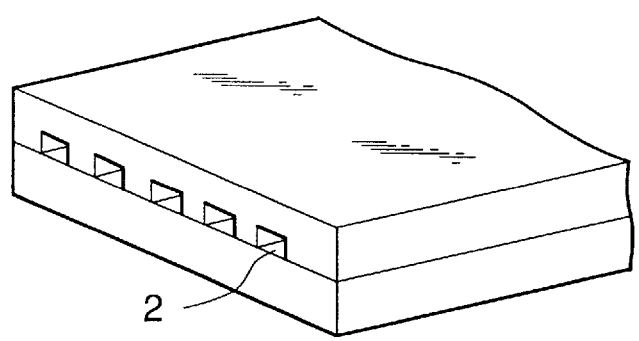
FIG. 3 is a view illustrating an exemplary head of the ink-jet recording apparatus, which is equipped with a plurality of nozzles.

Examples of the construction of a head, which is a main component of an apparatus using thermal energy as an ink-jet recording apparatus, are illustrated in FIGS. 1, 2 and 3.

A head 1 is formed by bonding a glass, ceramic, silicon or plastic plate or the like having a flow path (nozzle) 2 through which an ink is passed, to a heating element base 3. The heating element base 3 is composed of a protective layer 4 formed with silicon oxide, silicon nitride, silicon carbide or the like, electrodes 5 made of aluminum, gold, aluminum-copper alloy or the like, a heating resistor layer 6 formed with a high-melting material such as $HfB_2$, TaN or TaAl, a heat accumulating layer 7 formed with thermally oxidized silicon, aluminum oxide or the like, and a substrate 8 made of silicon, aluminum, aluminum nitride or the like having good heat radiating property.

Now, upon application of electric pulse signals to the electrodes 5 in the head, the heating element base 3 rapidly generates heat at the region shown by h to form bubbles in an ink which is in contact with the surface of this region. A meniscus 10 of the ink is projected by the action of the pressure thus produced, and the ink is ejected through the nozzle 2 of the head to fly out of an orifice 11 toward a recording material 13 in the form of recording droplets 12. FIG. 3 illustrates an appearance of a multi-head composed of an array of a number of heads as shown in FIG. 1.

Incidentally, FIG. 1 is a cross-sectional view of the head taken along the flow path of the ink, and FIG. 2 is a cross-sectional view taken along line 2–2' in FIG. 1.

Figure 4:
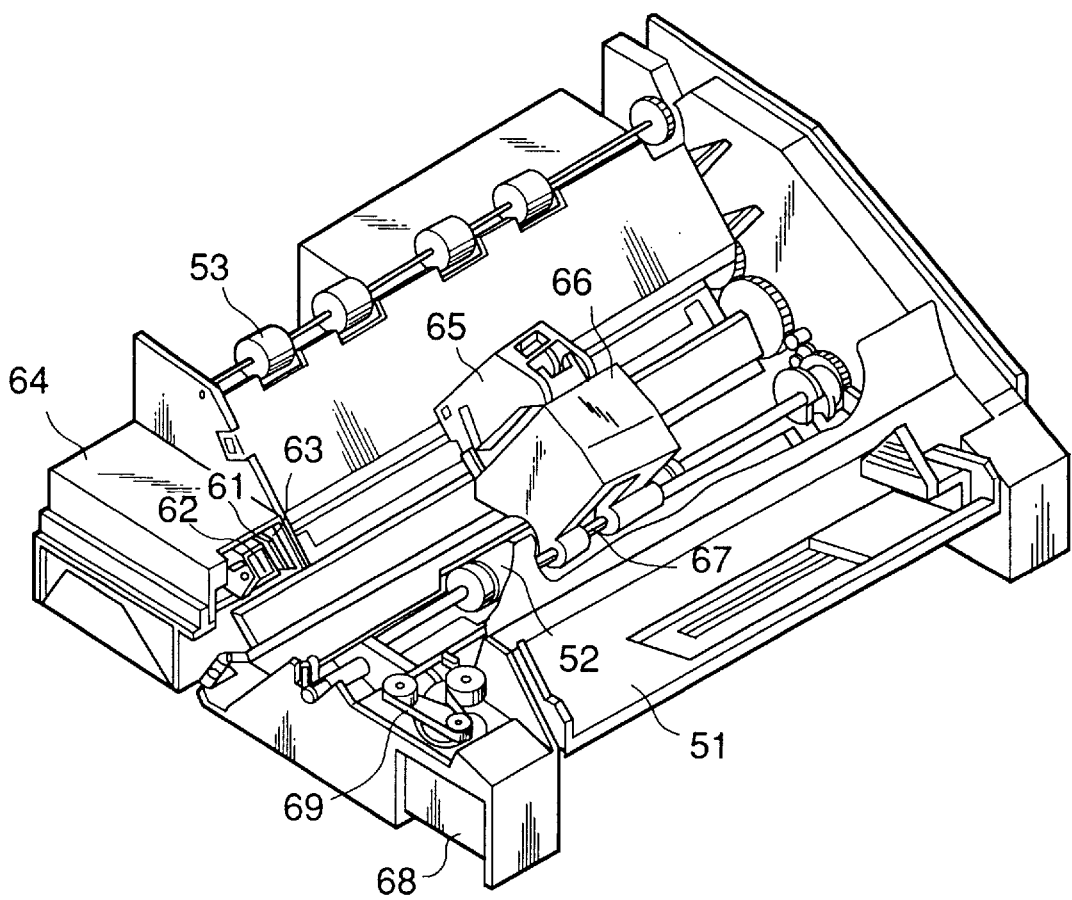
FIG. 4 is a perspective view illustrating an exemplary ink-jet recording apparatus.

FIG. 4 illustrates an example of an ink-jet recording apparatus in which such a head has been incorporated. In FIG. 4, reference numeral 61 designates a blade serving as a wiping member, one end of which is a stationary end held by a blade-holding member to form a cantilever. The blade 61 is provided at a position adjacent to a region in which a recording head operates, and is held in such a form that it protrudes to the course through which the recording head is moved. Reference numeral 62 indicates a cap, which is provided at the home position adjacent to the blade 61, and is so constituted that it moves in the direction perpendicular to the direction in which the recording head is moved and comes into contact with the face of ejection openings to cap it. Reference numeral 63 denotes an ink-absorbing member provided adjoiningly to the blade 61 and, similar to the blade 61, held in such a form that it protrudes to the course through which the recording head is moved. The above-described blade 61, cap 62 and absorbing member 63 constitute an ejection-recovery portion 64, where the blade 61 and absorbing member 63 remove water, dust and/or the like from the face of the ink-ejecting openings.

Reference numeral 65 designates the recording head having an ejection-energy-generating means and serving to eject the ink onto a recording material set in an opposing relation with the ejection opening face provided with ejection openings to conduct recording. Reference numeral 66 indicates a carriage on which the recording head 65 is mounted so that the recording head 65 can be moved. The carriage 66 is slidably interlocked with a guide rod 67 and is connected (not illustrated) at its part to a belt 69 driven by a motor 68. Thus, the carriage 66 can be moved along the guide rod 67 and hence, the recording head 65 can be moved from a recording region to a region adjacent thereto. Reference numerals 51 and 52 denote a paper feeding part from which the recording materials are separately inserted, and paper feed rollers driven by a motor (not illustrated), respectively. With such construction, the recording material is fed to the position opposite to the ejection opening face of the recording head, and discharged from a paper discharge section provided with paper discharge rollers 53 with the progress of recording.

In the above constitution, the cap 62 in the head recovery portion 64 is receded from the moving course of the recording head 65 when the recording head 65 is returned to its home position, for example, after completion of recording, and the blade 61 remains protruded to the moving course. As a result, the ejection opening face of the recording head 65 is wiped. When the cap 62 comes into contact with the ejection opening face of the recording head 65 to cap it, the cap 62 is moved so as to protrude to the moving course of the recording head. When the recording head 65 is moved from its home position to the position at which recording is started, the cap 62 and the blade 61 are at the same positions as the positions upon the wiping as described above. As a result, the ejection opening face of the recording head 65 is also wiped at the time of this movement.

The above movement of the recording head to its home position is made not only when the recording is completed or the recording head is recovered for ejection, but also when the recording head is moved between recording regions for the purpose of recording, during which it is moved to the home position adjacent to each recording region at given intervals, where the ejection opening face is wiped in accordance with this movement.

Figure 5:
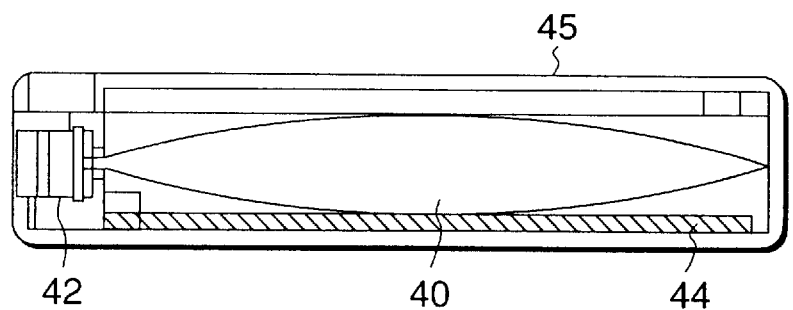
FIG. 5 is a longitudinal cross-sectional view illustrating an exemplary ink cartridge.

FIG. 5 illustrates an exemplary ink cartridge in which an ink to be fed to the head through an ink-feeding member, for example, a tube is contained. Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an ink-absorbing member for receiving a waste ink. It is preferred that the ink container portion is formed of a polyolefin, in particular, polyethylene, at its surface with which the ink comes into contact.

Figure 6:
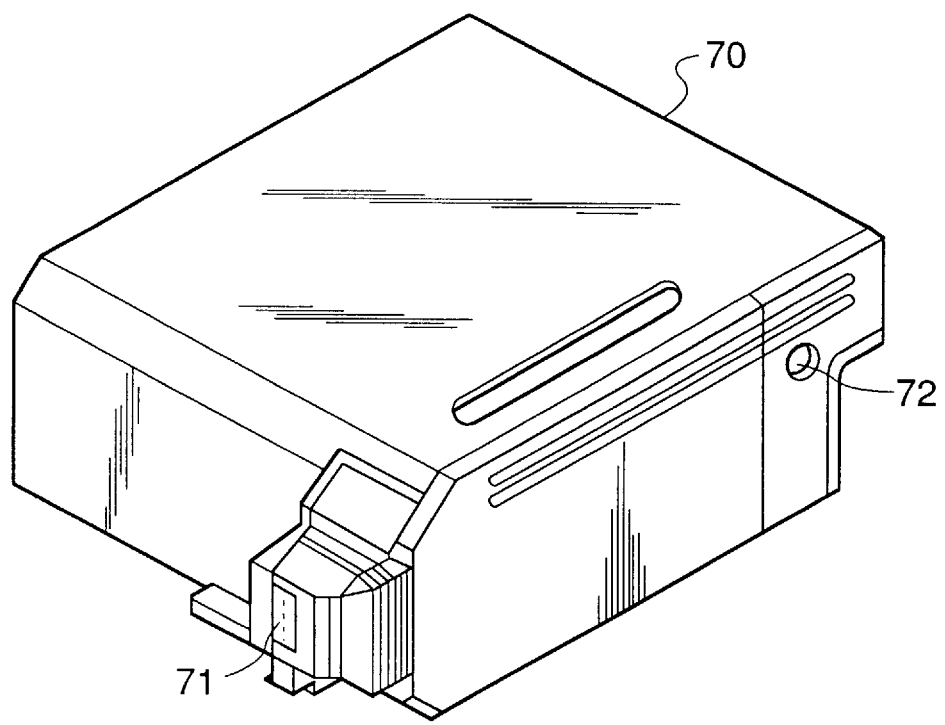
FIG. 6 is a perspective view of a unit in which an ink-jet recording head and an ink cartridge are integrally combined.

The ink-jet recording apparatus used in the present invention may not be limited to the apparatus as described above in which the head and the ink cartridge are separately provided. Therefore, a device in which these members are integrally formed as shown in FIG. 6 can also be preferably used. In FIG. 6, reference numeral 70 designates a recording unit, in the interior of which an ink container portion containing an ink, for example, an ink-absorbing member, is contained. The recording unit 70 is so constructed that the ink in such an ink-absorbing member is ejected in the form of ink droplets through a head 71 having a plurality of orifices. In the present invention, polyurethane is preferably used as a material for the ink-absorbing member. The recording unit 70 may be so constructed that the ink container portion is a bag for the ink in the interior of which a spring or the like is provided, not the ink-absorbing member. Reference numeral 72 indicates an air passage for communicating the interior of the recording unit 70 with the atmosphere. This recording unit 70 can be used in place of the recording head 65 shown in FIG. 3, and is detachably installed on the carriage 66.

As the second form of the ink-jet recording apparatus, may be mentioned an On-Demand type ink-jet recording apparatus comprising a nozzle-forming base having a plurality of nozzles, pressure-generating elements composed of a piezoelectric material and an electric conductive material provided in an opposing relation with the nozzles, and an ink filled around the pressure-generating elements, in which the pressure-generating elements are displaced by voltage applied to eject droplets of the ink from the nozzles.

Figure 7:
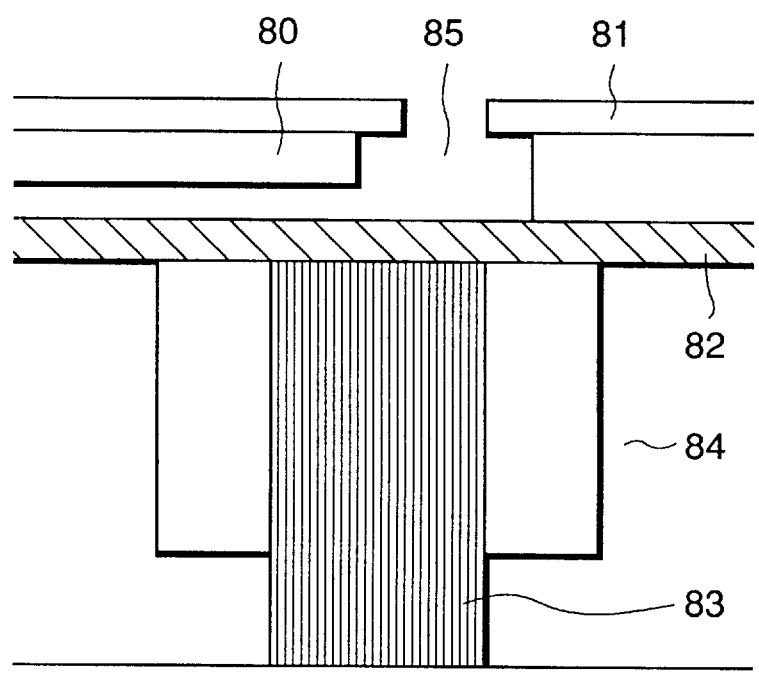
FIG. 7 is a longitudinal cross-sectional view of an ink-jet recording head using a piezoelectric element.

An example of the construction of a recording head, which is a main component of such a recording apparatus, is illustrated in FIG. 7.

The head is composed of an ink flow path 80 communicating with an ink chamber (not illustrated), an orifice plate 81 through which ink droplets having a desired volume are ejected, a vibration plate 82 directly applying a pressure to the ink, a piezoelectric element 83 bonded to the vibration plate 82 undergoing displacement according to an electric signal, and a substrate 84 adapted to support and fix the piezoelectric element 83, the orifice plate 81 and vibration plate 82 thereon.

In FIG. 7, the ink flow path 80 is formed with a photosensitive resin or the like. The orifice plate 81 is made of a metal such as stainless steel or nickel, the ejection opening 85 of which is defined by electroforming, punching by press working, or the like. The vibration plate 82 is formed with a film of a metal such as stainless steel, nickel or titanium and a high-modulus resin film or the like. The piezoelectric element 83 is made of a dielectric material such as barium titanate or PZT.

The recording head with the above constitution is operated in such a manner that pulsed voltage is applied to the piezoelectric element 83 to generate a stress to cause distortion, the vibration plate 82 bonded to the piezoelectric element 83 is deformed by the energy of the stress, and the ink in the ink flow path is thus perpendicularly pressurized to eject droplets of the ink from the ejection opening 85 of the orifice plate 81, thereby conducting recording.

Such a recording head is used by incorporating it into a recording apparatus similar to that illustrated in FIG. 4. Operation of details of the recording apparatus may be conducted in the same manner as described above.

The present invention will hereinafter be described specifically by the following Examples and Comparative Examples. Incidentally, all designations of "part" or "parts" as will be used in the following examples mean % by weight unless expressly noted.

First of all, the preparation of various inks according to the present invention will be described.

EXAMPLE 1

[Black Ink (K-1)]

A 200-ml beaker was charged with 5 g of ultrafine particles of anhydrous silica (trade name: Nippon Aerosil OX50), to which 100 ml of a 10% aqueous solution of C.I. Direct Black 17 as a dye was added. The mixture was stirred for 5 hours at a rotational speed of 1000 rpm by a magnetic stirrer. The liquid mixture in the beaker was then filtered through a membrane filter (product of Nihon Millipore Ltd.) having a pore size of 1.0 $\mu$m. The coloring material component captured on the filter was washed 3 times with deionized water, 2 times with 0.1N HCl and 3 times again with deionized water, and then placed in a dispersion container.

Further, 5.0 g of PMAA having a molecular weight of 60,000, 0.5 g of PEG having a molecular weight of 6,000 and deionized water in such an amount as the total weight amounted to 100 g were added. Zirconium beads having a diameter of 1 mm as a grinding medium were then added to the resultant mixture to give a packing rate of 50%. The thus-obtained mixture was charged into a sand grinder manufactured by Igarashi Kikai K.K., thereby subjecting the mixture to a dispersion treatment for 5 hours.

The dispersion thus obtained was further filtered through filter paper No. 5A (to remove the zirconium beads) and then subjected to a centrifugal treatment at 10,000 rpm for 30 minutes by a centrifugal separator to remove coarse particles, thereby preparing Black Ink (K-1).

EXAMPLE 2

[Black Ink (K-2)]

A 200-ml beaker was charged with 100 ml of a 10% aqueous solution of C.I. Food Black 2 as a dye. While stirring at a rotational speed of 800 rpm by a magnetic stirrer, 5 g of Cataloid AP (alumina sol powder, product of Catalysts & Chemicals Industries Co., Ltd.) were added to the beaker little by little so as not to form coarse lumps. The resultant mixture was continuously stirred for 8 hours. The liquid mixture was then filtered through a membrane filter having a pore size of 1.0 $\mu$m. The coloring material component captured on the filter was washed 3 times with deionized water, 2 times with 0.5N acetic acid and 3 times again with deionized water, and then placed in a dispersion container, to which 5.0 g of PMAA having a molecular weight of 60,000, 0.5 g of PEG having a molecular weight of 6,000 and 2.0 g of a PEO-PPO-PEO block copolymer (trade name: Newpole PE-74, product of Sanyo Chemical Industries, Ltd.) were added, and deionized water was added in such an amount as the total weight amounted to 100 g.

Zirconium beads having a diameter of 1 mm were then added to the resultant mixture to give a packing rate of 50%. The thus-obtained mixture was charged into a sand grinder manufactured by Igarashi Kikai K.K., thereby subjecting the mixture to a dispersion treatment for 5 hours.

Similarly to Example 1, the dispersion thus obtained was further filtered through filter paper No. 5A (to remove the zirconium beads) and then subjected to a centrifugal treatment at 10,000 rpm for 30 minutes by a centrifugal separator to remove coarse particles, thereby preparing Black Ink (K-2).

EXAMPLE 3
[Black Ink (K-3)]

Ten grams of sodium aluminate (product of Wako Pure Chemical Industries, Ltd.) were dissolved in 80 ml of deionized water. While stirring, 20 ml of a 10% aqueous solution of C.I. Direct Black 154 were added to the solution. Carbon dioxide was introduced into the solution to bubble it, thereby adjusting the pH of the solution to 5 or lower. Since fine particles of alumina colored with the dye were precipitated owing to hydrolysis, the solution was filtered through a membrane filter having a pore size of 1.0 $\mu$m. The coloring material component captured on the filter was washed with deionized water. The coloring material component was placed in a dispersion container, to which 5.0 g of poly-N-isopropylacrylamide having a molecular weight of 50,000, 2.0 g of a PEO-PPO-PEO block copolymer (trade name: Newpole PE-74, product of Sanyo Chemical Industries, Ltd.) and 5.0 g of diethylene glycol were added, and deionized water was added in such an amount as the total weight amounted to 100 g. Zirconium beads having a diameter of 2 mm were then added to the resultant mixture to give a packing rate of 50%. The thus-obtained mixture was charged into a sand grinder manufactured by Igarashi Kikai K.K., thereby subjecting the mixture to a dispersion treatment for 5 hours.

Similarly to Example 1, the dispersion thus obtained was further filtered through filter paper No. 5A (to remove the zirconium beads) and then subjected to a centrifugal treatment at 10,000 rpm for 30 minutes by a centrifugal separator to remove coarse particles. Further, 0.1 part of a solution of Acetylenol EH (product of Kawaken Fine Chemical Co., Ltd.) as a surfactant was added to prepare Black Ink (K-3).

EXAMPLE 4
[Black Ink (K-4)]

With a 0.5% aqueous solution of sodium alginate (product of Wako Pure Chemical Industries, Ltd.), were mixed 5 parts of titanium oxide (trade name: Titania IT-S, product of Idemitsu Kosan Co., Ltd.) and 10 parts of C.I. Direct Black 62 (Solution A). A 5% aqueous solution of calcium chloride (product of Wako Pure Chemical Industries, Ltd.) was separately prepared (Solution B). While stirring Solution B by a stirrer, Solution A was added dropwise to Solution B to mixed them, thereby obtaining an insoluble coloring material. The liquid mixture was filtered through a membrane filter having a pore size of 0.45 $\mu$m. The coloring material component captured on the filter was washed with deionized water. To deionized water, were added 5 parts of the coloring material, 5 parts of a styrene-maleic acid copolymer (acid value: 115, average molecular weight: 3,700), 5 parts of a polystyrene-polyacrylamide copolymer (trade name: Emulist SD-55, product of Sanyo Chemical Industries, Ltd.) and 7 parts of diethylene glycol. The resultant liquid mixture and zirconium beads were placed in a sand grinder manufactured by Igarashi Kikai K.K., thereby subjecting the mixture to a dispersion treatment for 5 hours.

The dispersion thus obtained was further filtered through filter paper No. 5A (to remove the zirconium beads) and then subjected to a centrifugal treatment at 10,000 rpm for 30 minutes by a centrifugal separator to remove coarse particles, thereby preparing Black Ink (K-4).

EXAMPLE 5
[Yellow Ink (Y-1)]

To 80 ml of a 10% aqueous solution of ammonium hydrogenphosphate (product of Wako Pure Chemical Industries, Ltd.), 20 ml of a 10% aqueous solution of C.I. Direct Yellow 86 were added with stirring, and a 10% aqueous solution of calcium nitrate (product of Wako Pure Chemical Industries, Ltd.) was then added with stirring. Further, 0.1N $HNO_3$ was added dropwise to completely precipitate a coloring material component.

The liquid mixture was filtered through a membrane filter having a pore size of 1.0 $\mu$m. The coloring material component captured on the filter was washed with deionized water, and then placed in a dispersion container, to which 5.0 g of PMAA having a molecular weight of 60,000, 0.3 g of PEG-PPG (molar ratio=7:3) and 5.0 g of diethylene glycol were added, and deionized water was added in such an amount as the total weight amounted to 100 g. Zirconium beads having a diameter of 1 mm were then added to the resultant mixture to give a packing rate of 50%. The thus-obtained mixture was charged into a sand grinder manufactured by Igarashi Kikai K.K., thereby subjecting the mixture to a dispersion treatment for 5 hours.

Similarly to Example 1, the dispersion thus obtained was further filtered through filter paper No. 5A (to remove the zirconium beads) and then subjected to a centrifugal treatment at 10,000 rpm for 30 minutes by a centrifugal separator to remove coarse particles, thereby preparing Yellow Ink (Y-1).

EXAMPLE 6
[Yellow Ink (Y-2)]

While stirring, 10 g of polymethyl methacrylate (particle size: 1.0 $\mu$m, product of Soken Chemical & Engineering Co., Ltd.) were added to a 5% aqueous solution of Alumina Sol 200 (product of Nissan Chemical Industries, Ltd.). After stirring the liquid mixture for 3 hours, it was filtered through a membrane filter having a pore size of 0.45 $\mu$m, and the particles captured on the filter were washed 3 times with 0.1N acetic acid. The thus-obtained polymer particles were then added to a 8% aqueous solution of C.I. Direct Yellow 44. The resultant liquid mixture was stirred for 3 hours and filtered again through the membrane filter. The coloring material component captured on the filter was washed with deionized water, and then placed in a dispersion container, to which 5.0 g of PMAA having a molecular weight of 60,000, 0.3 g of PEG-PPG (molar ratio=7:3) and 5.0 g of diethylene glycol were added, and deionized water was added in such an amount as the total weight amounted to 100 g. Zirconium beads having a diameter of 1 mm were then added to the resultant mixture to give a packing rate of 50%. The thus-obtained mixture was charged into a sand grinder manufactured by Igarashi Kikai K.K., thereby subjecting the mixture to a dispersion treatment for 5 hours.

Similarly to Example 1, the dispersion thus obtained was further filtered through filter paper No. 5A (to remove the zirconium beads) and then subjected to a centrifugal treatment at 10,000 rpm for 30 minutes by a centrifugal separator to remove coarse particles, thereby preparing Yellow Ink (Y-2).

EXAMPLE 7
[Magenta Ink (M-1)]

Similar to Example 1, a 200-ml beaker was charged with 5 g of ultrafine particles of anhydrous silica (trade name: Nippon Aerosil OX50), to which 100 ml of a 10% aqueous solution of C.I. Direct Red 227 were added. The mixture was stirred for 5 hours at a rotational speed of 1000 rpm by a magnetic stirrer. The liquid mixture in the beaker was then filtered through a membrane filter (product of Nihon Millipore Ltd.) having a pore size of 1.0 $\mu$m. The coloring material component captured on the filter was washed 3 times with deionized water, 2 times with 0.1N HCl and 3 times again with deionized water, and then placed in a dispersion container. Further, 5.0 g of PMAA having a molecular weight of 60,000, 0.5 g of PEG having a molecular weight of 6,000 and deionized water in such an amount as the total weight amounted to 100 g were added. Zirconium beads having a diameter of 1 mm as a grinding medium were then added to the resultant mixture to give a packing rate of 50%. The thus-obtained mixture was charged into a sand grinder manufactured by Igarashi Kikai K.K., thereby subjecting the mixture to a dispersion treatment for 5 hours. The dispersion thus obtained was further filtered through filter paper No. 5A (to remove the zirconium beads) and then subjected to a centrifugal treatment at 10,000 rpm for 30 minutes by a centrifugal separator to remove coarse particles, thereby preparing Magenta Ink (M-1).

EXAMPLE 8

[Magenta Ink (M-2)]

After preparing an ink in the same manner as in Example 7 described above, polyethylene oxide having a molecular weight of 1,600,000 was added in such an amount as it accounted for 0.005%, thereby preparing Magenta Ink (M-2).

EXAMPLE 9

[cyan Ink (C-1)]

While stirring, 10 g of polymethyl methacrylate (particle size: 1.0 μm, product of Soken Chemical & Engineering Co., Ltd.) were added to a 5% aqueous solution of Alumina Sol 200 (product of Nissan Chemical Industries, Ltd.). After stirring the liquid mixture for 3 hours, it was filtered through a membrane filter having a pore size of 0.45 μm, and the particles captured on the filter were washed 3 times with 0.1N acetic acid. The thus-obtained polymer particles were then added to a 8% aqueous solution of C.I. Direct Blue 199. The resultant liquid mixture was stirred for 3 hours and filtered again through the membrane filter. The coloring material component captured on the filter was washed with deionized water, and then placed in a dispersion container, to which 5.0 g of PMAA having a molecular weight of 60,000, 0.3 g of PEG-PPG (molar ratio=7:3) and 5.0 g of diethylene glycol were added, and deionized water was added in such an amount as the total weight amounted to 100 g. Zirconium beads having a diameter of 1 mm were then added to the resultant mixture to give a packing rate of 50%. The thus-obtained mixture was charged into a sand grinder manufactured by Igarashi Kikai K.K., thereby subjecting the mixture to a dispersion treatment for 5 hours.

Similarly to Example 1, the dispersion thus obtained was further filtered through filter paper No. 5A (to remove the zirconium beads) and then subjected to a centrifugal treatment at 10,000 rpm for 30 minutes by a centrifugal separator to remove coarse particles, thereby preparing Cyan Ink (C-1).

EXAMPLE 10

[Cyan Ink (C-2)]

A 200-ml beaker was charged with 5 g of ultrafine particles of γ-alumina (trade name: Micropolish, product of Buehler Company, particle size: 0.05 μm), to which 100 ml of a 8% aqueous solution of C.I. Acid Blue 9 were added. The mixture was stirred for 5 hours at a rotational speed of 1000 rpm by a magnetic stirrer. The liquid mixture in the beaker was then filtered through a membrane filter (product of Nihon Millipore Ltd.) having a pore size of 1.0 μm. The coloring material component captured on the filter was washed 3 times with deionized water, 2 times with 0.1N HCl, 3 times again with deionized water and further 3 times with a 5% aqueous solution of an imidazoline type surfactant (trade name: Cation SF-75, product of Sanyo Chemical Industries, Ltd.) as a dye-fixing agent, and then placed in a dispersion container together with 10 ml of a 15% aqueous solution of a dispersing agent (trade name: KAO Demol N). Further, 5.0 g of PMAA having a molecular weight of 60,000, 0.5 g of PEG having a molecular weight of 6,000 and deionized water in such an amount as the total weight amounted to 100 g were added. Zirconium beads having a diameter of 1 mm as a grinding medium were then added to the resultant mixture to give a packing rate of 50%. The thus-obtained mixture was charged into a sand grinder manufactured by Igarashi Kikai K.K., thereby subjecting the mixture to a dispersion treatment for 5 hours.

The dispersion thus obtained was further filtered through filter paper No. 5A (to remove the zirconium beads) and then subjected to a centrifugal treatment at 10,000 rpm for 30 minutes by a centrifugal separator to remove coarse particles, thereby preparing Cyan Ink (C-2).

EXAMPLE 11

[Cyan Ink (C-3)]

Five parts of a styrene-acrylic acid copolymer (acid value: 115, average molecular weight: 3,700) were mixed with 50 parts of deionized water and 5 parts of diethylene glycol. The mixture was heated to 70° C. in a water bath to completely dissolve the resin component therein. To the resultant solution, were added 10 parts of ultramarine blue (product of Daiich Kasei Kogyo Co., Ltd., particle size: 0.5 to 1.0 μm), 5 parts of ethanol, 5 parts of PMAA having a molecular weight of 60,000, 1 part of PEG having a molecular weight of 6,000 and 0.5 part of poly-N-vinyl pyrrolidone (product of Wako Pure Chemical Industries, Ltd.), and further deionized water in such an amount as the total weight amounted to 100 parts, followed by their premixing for 30 minutes. Zirconium beads having a diameter of 1 mm as a grinding medium were then added to the resultant premix to give a packing rate of 50%. The thus-obtained mixture was charged into a sand grinder manufactured by Igarashi Kikai K.K., thereby subjecting the mixture to a dispersion treatment for 5 hours.

The dispersion thus obtained was further filtered through filter paper No. 5A (to remove the zirconium beads) and then subjected to a centrifugal treatment at 10,000 rpm for 30 minutes by a centrifugal separator to remove coarse particles into a dispersion. The thus-prepared dispersion was then mixed with other components in accordance with the following formulation, thereby preparing Cyan Ink (C-3).

| | |
|---|---|
| Dispersion | 40 parts |
| Thiodiglycol | 10 parts |
| Ethanol | 5 parts |
| Deionized water | 45 parts. |

Comparative Example 1

(Black Ink KR-1)

As a comparative example, Black Ink KR-1 was prepared by evenly stirring and mixing the conventional composition composed of the following components:

| | |
|---|---|
| C.I. Direct Black 17 | 3 parts |
| Glycerol | 10 parts |
| 2-Propanol | 5 parts |
| Deionized water | 82 parts. |

Comparative Example 2

(Black Ink KPR-1)

Ink KPR-1 of the conventional type using a pigment as a coloring material was prepared in accordance with the following procedure.

(Preparation of pigment dispersion)

| | |
|---|---|
| Styrene-acrylic acid copolymer (acid value: 116, average molecular weight: 3,700) | 5 parts |
| Diethylene glycol | 5 parts |
| Deionized water | 65 parts |

The above components were mixed, and heated to 70° C. in a water bath to completely dissolve the resin therein. To this solution, were added 15 parts of carbon black (MCF 88, product of Mitsubishi Chemical Industries Limited) and 10 parts of 2-propanol to premix them for 30 minutes. Thereafter, the resulting premix was subjected to a dispersion treatment under the following conditions:

Grinding medium: zirconium beads (diameter: 1 mm)

Packing rate of the grinding medium:
 50% (by volume)

Grinding time: 3 hours.

The dispersion was further subjected to a centrifugal treatment (10,000 rpm, 20 minutes) to remove coarse particles into a dispersion. The thus-prepared dispersion was mixed with other components in the following formulation, thereby preparing Black Ink KPR-1.

| | |
|---|---|
| Dispersion described above | 30 parts |
| Dithioglycol | 20 parts |
| 2-Propanol | 5 parts |
| Deionized water | 45 parts. |

Comparative Example 3

(Yellow Ink YR-1)

Similarly to Comparative Example 1, as an example of the conventional color inks, Yellow Ink YR-1 was prepared by intimately mixing the following components:

| | |
|---|---|
| C.I. Direct Yellow 86 | 2 parts |
| Triethylene glycol | 6 parts |
| Hexanetriol | 6 parts |
| 2-Propanol | 2 parts |
| Deionized water | 84 parts. |

Comparative Example 4

(Magenta Ink MR-1)

Similarly to Comparative Example 1, as an example of the conventional color inks, Magenta Ink MR-1 was prepared by intimately mixing the following components:

| | |
|---|---|
| C.I. Direct Red 227 | 3 parts |
| Triethyiene glycol | 6 parts |
| Hexanetriol | 6 parts |
| 2-Propanol | 2 parts |
| Deionized water | 83 parts. |

Comparative Example 5

(Cyan Ink CR-1)

Similarly to Comparative Example 1, as an example of the conventional color inks, Cyan Ink CR-1 was prepared by intimately mixing the following components:

| | |
|---|---|
| C.I. Direct Blue 199 | 3 parts |
| Triethylene glycol | 6 parts |
| Hexanetriol | 6 parts |
| 2-Propanol | 2 parts |
| Deionized water | 83 parts. |

The performances of the above-described inks of Examples 1 to 11 and Comparative Examples 1 to 5 were evaluated.

Five performance items of (1) optical density (OD value), (2) fixing time, (3) resistance to feathering, (4) resistance to bleeding and (5) water fastness were evaluated. Each evaluation was conducted in an air-conditioned laboratory controlled at 23° C. and 60% RH. The evaluation methods of the respective items will hereinafter be described specifically.

(1) Optical density (OD value)

A pattern including 5 solid printed areas of 5 mm square was printed on an A4-sized paper sheet. After the resulting print sample was left standing for at least 30 minutes, its optical density was measured. The optical densities of the 5 solid printed areas were measured by a Macbeth reflection densitometer RD914, and their average value was taken as an OD value of the sample.

(2) Fixing time

All the letters of the alphabet, and numerals of 0 to 9 were continuously recorded on an A4-sized paper sheet in proportions of 40 lines per sheet and 36 characters to the line at a rate of 1 second per line and a line feed of 0.5 second. The fixing time was determined by measuring the time required until recorded images became free from running due to rubbing when a weight wrapped in Silbon C paper was pressed at a load of 40 g/cm$^2$ against the recorded surface of the recorded sample at the same time as it was discharged from a printer.

(3) Resistance to feathering

Dots were recorded on an A4-sized paper sheet with nozzles of a recording head thinned out every other nozzle. After the thus-obtained print sample was left over for at least 30 minutes, its dots were observed through a magnifier, and the resistance to feathering was evaluated in terms of 5 ranks as 5 where they were round, 4 where they underwent feathering or deformation at a quarter of their circumference, 3 where they underwent feathering or deformation at a half of their circumference, 2 where they underwent feathering or deformation at three quarters of their circumference, or 1 where they had no round area.

(4) Resistance to bleeding

A solid printed area of 20 mm square was recorded on an A4-sized paper sheet, and another solid printed area of 20 mm square was then recorded with an ink different in color from the ink used in the first recording in such a manner that their printed areas adjoined each other. After the thus-obtained print sample was left standing for at least 30 minutes, its boundary portion between the different colors was observed through a magnifier, and the resistance to bleeding was organoleptically evaluated in terms of 5 ranks as 5 where no color mixing occurred at the whole boundary line of 20 mm long, 4 where color mixing occurred over a width corresponding to the diameter (100 $\mu$m) of about one dot, 3 in the case of 2 dots, 2 in the case of 3 dots, or 1 in the case of 4 dots or more.

(5) Water fastness

The same pattern as in the evaluation item (1) was recorded on an A4-sized paper sheet, and its OD value was measured in advance. After the print sample was left over for 1 hour, it was immersed for 5 seconds in a stainless steel vat of 40 cm square filled with deionized water. The sample sheet was then taken out of the vat and air-dried. Thereafter, its OD value was measured again, thereby calculating a quotient of (the OD value measured later)/(the initial OD value) to take its percentage as the performance value for the water fastness.

(Machine used in evaluation)

Figure 8:
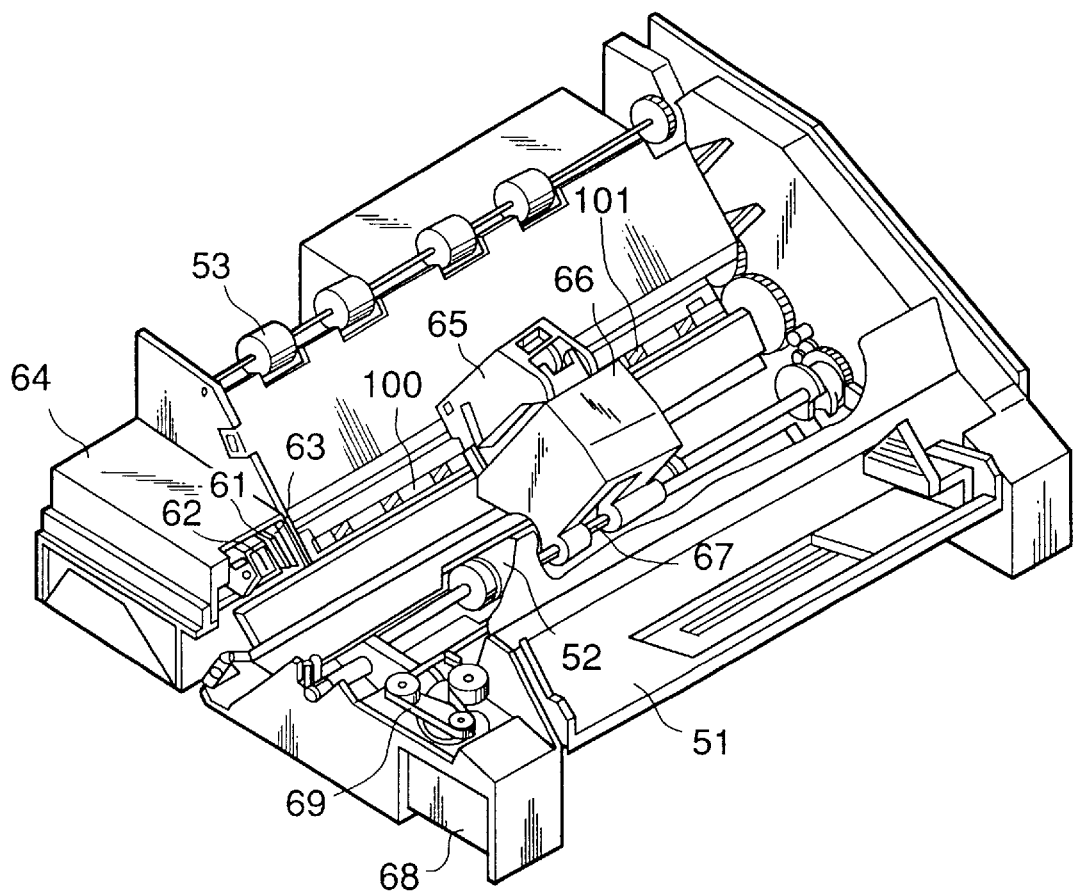
FIG. 8 is a perspective view illustrating an exemplary ink-jet recording apparatus equipped with a heating element.

As recording apparatus for the above evaluation, were used BJ10ex (trade mark) and BJ300 (trade mark) both manufactured by Canon Inc. The supply of ink was conducted in accordance with a method in which the intended inks are filled in the respective special ink containers. Incidentally, BJ10ex is so preset that the temperature of a head during recording is controlled to 60° C. by pulse width modulation. In BJ300 on the other hand, a mechanism for heating a paper sheet during recording is incorporated. An outline of such a mechanism is illustrated in FIG. 8. The recording apparatus illustrated in FIG. 8 is constructed by arranging a heating element 100 in the basic recording apparatus illustrated in FIG. 4. The heating element 100 is made by arranging 10 thermal heads 101 (P-8010, manufactured by Nippon Toki K.K.) in the breadth of an A4 size. Its applied voltage and power are 19 V and 56 W/mm$^2$, respectively. It can heat the surface of paper within a range of from +10° C. to +80° C. by controlling its drive pulse width and drive frequency.

The evaluation of the above evaluation items (1), (2), (3) and (5) was conducted with two kinds of NP-SK paper (trade name) and XX4024 paper (trade name). In the evaluation of the item (4), only NP-SK paper was used.

(Result of evaluation)

In Table 1, are shown the results of the performance evaluation [evaluation items (1), (2), (3) and (5)] as to the inks according to the present invention and the conventional inks using BJ10ex. The evaluation of the item (4) was conducted as to combinations of the respective colors of the inks according to the present invention. The results are shown in Table 2. Incidentally, the results of the evaluation of the conventional inks in resistance to bleeding are shown in Table 3.

The results of the same performance evaluation as described above using BJ300 are shown in Tables 4, 5 and 6, respectively. The recording was conducted by controlling the heating element in such a manner that the surface of the paper was heated to 80° C. during printing (distance between the heating element and the surface of the paper: 0 to 0.5 mm).

TABLE 1

Evaluation results of OD, fixing time, resistance to feathering and water fastness (BJ10ex)

| Ink | OD | | Fixing time (sec) | | Feathering resistance | | Water fastness (%) | |
|---|---|---|---|---|---|---|---|---|
| | NP-SK | XX4024 | NP-SK | XX4024 | NP-SK | XX4024 | NP-SK | XX4024 |
| K-1 | 1.45 | 1.42 | 18 | 15 | 4 | 4 | 98 | 100 |
| K-2 | 1.42 | 1.38 | 15 | 14 | 4 | 4 | 99 | 100 |
| K-3 | 1.41 | 1.39 | 8 | 10 | 4 | 4 | 95 | 98 |
| K-4 | 1.43 | 1.41 | 18 | 15 | 5 | 5 | 99 | 100 |
| Y-1 | 0.75 | 0.71 | 10 | 10 | 4 | 4 | 95 | 98 |
| Y-2 | 0.76 | 0.75 | 10 | 8 | 4 | 4 | 95 | 100 |
| M-1 | 0.91 | 0.90 | 15 | 12 | 4 | 4 | 98 | 100 |
| M-2 | 0.92 | 0.91 | 15 | 14 | 4 | 4 | 95 | 95 |
| C-1 | 0.92 | 0.90 | 12 | 10 | 4 | 4 | 99 | 100 |
| C-2 | 1.01 | 0.98 | 19 | 15 | 4 | 4 | 99 | 100 |
| C-3 | 0.98 | 0.95 | 15 | 12 | 4 | 4 | 95 | 98 |
| KR-1 | 1.39 | 1.36 | 30 | 21 | 3 | 3 | 70 | 72 |
| KPR-1 | 1.33 | 1.01 | >40 | 30 | 4 | 4 | 45 | 50 |
| YR-1 | 0.69 | 0.61 | 31 | 21 | 3 | 2 | 65 | 70 |
| MR-1 | 0.83 | 0.75 | 32 | 22 | 3 | 3 | 60 | 65 |
| CR-1 | 0.88 | 0.74 | 30 | 20 | 3 | 2 | 55 | 60 |

TABLE 2

Evaluation results of resistance to bleeding (BJ10ex)

| | K-1 | K-2 | K-3 | K-4 | Y-1 | Y-2 | M-1 | M-2 | C-1 | C-2 | C-3 |
|---|---|---|---|---|---|---|---|---|---|---|---|
| K-1 | * | * | * | * | 4 | 4 | 5 | 4 | 4 | 4 | 5 |
| K-2 | * | * | * | * | 4 | 4 | 5 | 4 | 4 | 4 | 4 |
| K-3 | * | * | * | * | 5 | 4 | 5 | 4 | 4 | 5 | 4 |
| K-4 | * | * | * | * | 5 | 4 | 4 | 4 | 4 | 4 | 4 |
| Y-1 | 4 | 4 | 5 | 5 | * | * | 5 | 5 | 4 | 4 | 4 |
| Y-2 | 4 | 4 | 4 | 4 | * | * | 4 | 4 | 4 | 4 | 4 |
| M-1 | 5 | 5 | 5 | 4 | 5 | 4 | * | * | 4 | 4 | 4 |
| M-2 | 4 | 4 | 4 | 4 | 5 | 4 | * | * | 4 | 4 | 4 |
| C-1 | 4 | 4 | 4 | 4 | 4 | 4 | 4 | 4 | * | * | * |
| C-2 | 4 | 4 | 5 | 4 | 4 | 4 | 4 | 4 | * | * | * |
| C-3 | 5 | 4 | 4 | 4 | 4 | 4 | 4 | 4 | * | * | * |

TABLE 3

Evaluation results of resistance to bleeding
as to the conventional inks (BJ10ex)

|  | KR-1 | KPR-1 | YR-1 | MR-1 | CR-1 |
|---|---|---|---|---|---|
| KR-1 | * | * | 2 | 1 | 2 |
| KPR-1 | * | * | 1 | 2 | 1 |
| YR-1 | 2 | 1 | * | 1 | 2 |
| MR-1 | 1 | 2 | 1 | * | 1 |
| CR-1 | 2 | 1 | 2 | 1 | * |

TABLE 4

Evalulation results of OD, fixing time, resistance
to feathering and water fastness (BJ300)

| Ink | OD | | Fixing time (sec) | | Feathering resistance | | Water fastness (%) | |
|---|---|---|---|---|---|---|---|---|
|  | NP-SK | XX4024 | NP-SK | XX4024 | NP-SK | XX4024 | NP-SK | XX4024 |
| K-1 | 1.45 | 1.45 | 3 | 3 | 5 | 5 | 99 | 100 |
| K-2 | 1.42 | 1.43 | 3 | 3 | 5 | 5 | 99 | 100 |
| K-3 | 1.41 | 1.40 | 1 | 1 | 5 | 5 | 95 | 98 |
| K-4 | 1.43 | 1.43 | 4 | 4 | 5 | 5 | 99 | 100 |
| Y-1 | 0.95 | 0.94 | 2 | 2 | 5 | 5 | 95 | 98 |
| Y-2 | 0.89 | 0.89 | 2 | 2 | 5 | 5 | 98 | 100 |
| M-1 | 0.98 | 0.97 | 3 | 3 | 5 | 5 | 98 | 100 |
| M-2 | 1.05 | 1.05 | 3 | 2 | 4 | 4 | 95 | 95 |
| C-1 | 1.00 | 1.00 | 2 | 2 | 4 | 4 | 99 | 100 |
| C-2 | 1.15 | 1.15 | 5 | 5 | 5 | 5 | 100 | 100 |
| C-3 | 1.10 | 1.10 | 3 | 3 | 4 | 4 | 95 | 98 |
| KR-1 | 1.41 | 1.38 | 12 | 10 | 4 | 4 | 75 | 78 |
| KPR-1 | 1.40 | 1.25 | 22 | 20 | 4 | 4 | 55 | 60 |
| YR-1 | 0.71 | 0.68 | 15 | 12 | 4 | 3 | 65 | 70 |
| MR-1 | 0.88 | 0.82 | 12 | 12 | 3 | 3 | 60 | 65 |
| CR-1 | 0.91 | 0.89 | 12 | 12 | 3 | 3 | 55 | 60 |

TABLE 5

Evaluation results of resistance to bleeding (BJ300)

|  | K-1 | K-2 | K-3 | K-4 | Y-1 | Y-2 | M-1 | M-2 | C-1 | C-2 | C-3 |
|---|---|---|---|---|---|---|---|---|---|---|---|
| K-1 | * | * | * | * | 4 | 4 | 5 | 4 | 5 | 5 | 5 |
| K-2 | * | * | * | * | 4 | 4 | 5 | 4 | 5 | 5 | 5 |
| K-3 | * | * | * | * | 5 | 5 | 5 | 5 | 5 | 5 | 4 |
| K-4 | * | * | * | * | 5 | 4 | 4 | 4 | 5 | 4 | 4 |
| Y-1 | 4 | 4 | 5 | 5 | * | * | 5 | 5 | 4 | 4 | 4 |
| Y-2 | 4 | 4 | 5 | 4 | * | * | 4 | 5 | 5 | 4 | 4 |
| M-1 | 5 | 5 | 5 | 4 | 5 | 4 | * | * | 5 | 4 | 4 |
| M-2 | 4 | 4 | 5 | 4 | 5 | 5 | * | * | 4 | 5 | 4 |
| C-1 | 5 | 5 | 5 | 5 | 4 | 5 | 5 | 4 | * | * | * |
| C-2 | 5 | 5 | 5 | 4 | 4 | 4 | 4 | 5 | * | * | * |
| C-3 | 5 | 5 | 4 | 4 | 4 | 4 | 4 | 4 | * | * | * |

TABLE 6

Evaluation results of resistance to bleeding
as to the conventional inks (BJ300)

|  | KR-1 | KPR-1 | YR-1 | MR-1 | CR-1 |
|---|---|---|---|---|---|
| KR-1 | * | * | 3 | 2 | 3 |
| KPR-1 | * | * | 1 | 2 | 1 |
| YR-1 | 3 | 1 | * | 4 | 4 |
| MR-1 | 2 | 2 | 4 | * | 3 |
| CR-1 | 3 | 1 | 4 | 3 | * |

The results of Table 1 revealed that the HES inks according to the present invention permit high-speed fixing while maintaining high OD and are also excellent in resistance to feathering and water fastness compared with the conventional inks. With respect to resistance to bleeding, the inks are said to have a great effect of preventing color mixing owing to their change of state on the surface of paper.

According to the results of the evaluation using BJ300, as shown in Tables 4 and 5, it was recognized that since the heating facilitates the change of state of the HES inks, the performance is improved in all the evaluation items compared with the cases where the paper is not heated.

As described above, the image formation with the inks according to the present invention do not depend on only evaporation and penetration, and so recording which permits high-speed fixing while providing high OD can be realized. In addition, the problem of color mixing (bleeding), which must be referred to upon high-quality recording, can also be solved at the same time. The inks according to the present invention markedly exhibit such effects when they are used in combination with ink-jet recording apparatus.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A water-based ink composition comprising coloring material particles having a core-shell structure obtained by adsorbing a dye on surfaces of cores, which are water-insoluble inorganic fine particles having a particle size on the order of about 0.1 μm and having an isoelectric point of 7 or lower, or inorganic colloidal substances, and an aqueous solution of a water-soluble polymer, in which solution said coloring material particles are dispersed, wherein the polymer chains of the polymer in the composition undergo dissociation or association in response to a temperature change ranging from 20° to 50° C. or pH change ranging from 7 to 10, wherein the water-soluble polymer is present in an amount of 0.01 to 10.0 percent by weight of the ink, and is selected from a mixture of polymethacrylic acid and polyethylene glycol, a mixture of polymethacrylic acid and polyethylene glycol-polypropylene glycol copolymer, a mixture of polyacrylic acid and a poly (N-alkyl-substituted acrylamide), a polyethylene oxide-polypropylene oxide-polyethylene oxide block copolymer, and a composite thereof.

2. A water-based ink composition comprising coloring material particles having a core-shell structure obtained by adsorbing a dye on surfaces of cores, which are water-insoluble inorganic fine particles having a particle size on the order of about 0.1 μm and having an isoelectric point of 7 or lower, or inorganic colloidal substances, and an aqueous solution of a water-soluble polymer and a thread-forming polymer, in which solution said coloring material particles are dispersed, wherein the polymer chains of the water-soluble polymer in the composition undergo dissociation or association in response to a temperature change ranging from 20° to 50° C. or pH change ranging from 7 to 10, wherein the water-soluble polymer is present in an amount of 0.01 to 10.0 percent by weight of the ink, and is selected from a mixture of polymethacrylic acid and polyethylene glycol, a mixture of polymethacrylic acid and polyethylene glycol-polypropylene glycol copolymer, a mixture of polyacrylic acid and a poly (N-alkyl-substituted acrylamide), a polyethylene oxide-polypropylene oxide-polyethylene oxide block copolymer, and a composite thereof; and wherein the thread-forming polymer is selected from polyethylene oxide, a starch thickener, a cellulose thickener, a seaweed thickener, a gum thickener, and a synthetic thickener.

3. The ink according to claim 1 or 2, wherein the coloring material particles are insoluble in water.

4. The ink according to claim 1 or 2, which contains the coloring material particles in an amount ranging from 0.01% to 8.0% by weight based on the total weight of the ink.

5. The ink according to claim 1 or 2, which contains the water-soluble polymer in an amount ranging from 0.01% to 10.0% by weight based on the total weight of the ink.

6. The ink according to claim 2, which contains the thread-forming polymer in an amount ranging from 0.001% to 5% by weight based on the total weight of the ink.

7. The ink according to claim 1 or 2, wherein the fine particles of the cores are any one of water-insoluble metal oxides, metal phosphates, metal hydrogenphosphates, metal silicates, titanates, tungstates, zirconates and complexes of the fine particle of the water-insoluble metal oxide with a hydrolyzable metal salt selected from the group consisting of metal phosphates, metal hydrogenphosphates, metal silicates, titanates, tungstates, and zirconates.

8. The ink according to claim 1 or 2, wherein the fine particles are fine particles of an organic polymer which are coated with any one of water-insoluble metal oxides, metal phosphates, metal hydrogenphosphates, metal silicates, titanates, tungstates, zirconates and complexes of the fine particle of the water-insoluble metal oxide with a hydrolyzable metal salt selected from the group consisting of metal phosphates, metal hydrogenphosphates, metal silicates, titanates, tungstates and zirconates.

9. The ink according to claim 2, wherein the thread-forming polymer is present in an amount of 0.001 to 5 percent by weight of the ink.

10. The ink according to claim 2, wherein said cellulose thickener is methylcellulose, said seaweed thickener is sodium alginate, said gum thickener is locust bean gum, or said synthetic thickener is vinyl acetate/maleic anhydride copolymers.

11. An ink-jet recording method comprising the steps of applying droplets of an ink according to claim 1 or 2 to a recording material, and conducting recording.

12. The ink-jet recording method according to claim 11, wherein the ink-jet system is a system in which thermal energy is applied to the ink.

13. The ink-jet recording method according to claim 11, wherein recording is conducted while heating the recording material.

* * * * *

UNITED STATES PATENT AND TRADEMARK OFFICE
CERTIFICATE OF CORRECTION

PATENT NO. : 5,854,307

DATED : December 29, 1998

INVENTOR(S) : ISAO KIMURA, ET AL.

It is certified that error appears in the above-identified patent and that said Letters Patent is hereby corrected as shown below:

ON THE COVER PAGE

Item [56] FOREIGN PATENT DOCUMENTS:

"3240586    10/1901" should read
--3-240586   10/1991--.

IN THE DISCLOSURE

COLUMN 1:

Line 18, "such" should be deleted.
Line 19, "advantages" should read
--advantages, such--.

COLUMN 2:

Line 48, "(the" should read --(The--.

COLUMN 3:

Line 16, "of" should be deleted.
Line 25, "of" should be deleted.

COLUMN 5:

Line 1, "tangstates," should read --tungstates,--.
Line 26, "suitablefor" should read --suitable for--.

UNITED STATES PATENT AND TRADEMARK OFFICE
CERTIFICATE OF CORRECTION

PATENT NO. : 5,854,307

DATED : December 29, 1998

INVENTOR(S) : ISAO KIMURA, ET AL.

It is certified that error appears in the above-identified patent and that said Letters Patent is hereby corrected as shown below:

COLUMN 6:

Line 11, "a" should read --an--.
    Line 22, "tangstates" should read --tungstates--.

COLUMN 7:

Line 1, "Yosuke Takeuchi" should read --Yohsuke Takeuchi--.

COLUMN 8:

Line 65, "above" should read --above- --.

COLUMN 13:

Line 45, "mixed" should read --mix--.

COLUMN 15:

Line 57, "a" should read --an--.

UNITED STATES PATENT AND TRADEMARK OFFICE
CERTIFICATE OF CORRECTION

PATENT NO. : 5,854,307

DATED : December 29, 1998

INVENTOR(S) : ISAO KIMURA, ET AL.

It is certified that error appears in the above-identified patent and that said Letters Patent is hereby corrected as shown below:

COLUMN 20:

Line 8, "Table 1," should read --Table 1--.

Signed and Sealed this

Seventh Day of December, 1999

Attest:

Q. TODD DICKINSON

Attesting Officer

Acting Commissioner of Patents and Trademarks